(12) United States Patent
Ishida et al.

(10) Patent No.: US 10,104,213 B2
(45) Date of Patent: *Oct. 16, 2018

(54) INFORMATION PROCESSING DEVICE (71) Applicant: SONY MOBILE COMMUNICATIONS INC., Tokyo (JP)

(72) Inventors: Akihiro Ishida, Kanagawa (JP); Yoji Hirose, Kanagawa (JP); Takamoto Tsuda, Kanagawa (JP); Shihui Wang, Tokyo (JP); Ryu Aoyama, Kanagawa (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,234

(22) Filed: Dec. 4, 2017

(65) Prior Publication Data

US 2018/0091637 A1  Mar. 29, 2018

Related U.S. Application Data

(63) Continuation of application No. 15/417,591, filed on Jan. 27, 2017, now Pat. No. 9,838,522.

(30) Foreign Application Priority Data

Feb. 18, 2016 (JP) .................................. 2016-029069

(51) Int. Cl.
*H04M 1/60* (2006.01)
*H04M 1/725* (2006.01)
*H04B 1/3827* (2015.01)

(52) U.S. Cl.
CPC .......... *H04M 1/6066* (2013.01); *H04B 1/385* (2013.01); *H04M 1/72527* (2013.01)

(58) Field of Classification Search
CPC ............................. H04M 1/6058; H04B 1/385
USPC .... 455/550.1, 557, 569.1, 575.6, 90.2, 67.11
See application file for complete search history.

(56) References Cited

U.S. PATENT DOCUMENTS

| 2011/0144779 | A1* | 6/2011 | Janse | ............... | G11B 20/10009 700/94 |
| 2015/0180549 | A1* | 6/2015 | Nagasaki | ............. | H04B 5/0031 340/10.51 |
| 2015/0201439 | A1* | 7/2015 | Park | .................... | H04W 76/026 370/338 |
| 2016/0248901 | A1* | 8/2016 | Yamamoto | ............. | H04B 1/385 |

FOREIGN PATENT DOCUMENTS

JP  2001-238262  8/2001

* cited by examiner

*Primary Examiner* — John J Lee
(74) *Attorney, Agent, or Firm* — Xsensus, LLP (57) ABSTRACT

There is provided an information processing device including: a sensor configured to detect that the information processing device is worn on a part of a human body; a processing unit configured to process information; and a communication unit configured to communicate with another device. The processing unit transmits a signal to the another device on the basis of a detection signal detected by the sensor. The processing unit performs a process according to an instruction transmitted from the another device in accordance with the signal.

19 Claims, 8 Drawing Sheets

| OPERATION PATTERN | POWER OFF | NO CONNECTION | PAIRING | STANDBY | MUSIC PLAYBACK | INCOMING CALL | ONGOING CALL | OUTGOING CALL | SECOND INCOMING CALL | SECOND ONGOING CALL | SECOND OUTGOING CALL | VOICE OPERATION |
|---|---|---|---|---|---|---|---|---|---|---|---|---|
| SINGLE SHORT PRESS | | TRY TO CONNECT | | VOICE OPERATION TRIGGER | | ANSWER | END CALL | END CALL | ANSWER | END CALL | END CALL | POSITIVE ACKNOWLEDGMENT |
| DOUBLE SHORT PRESS | | | | | | | | | | SWITCH CALLS | | |
| 2-SECOND LONG PRESS | POWER ON | | | SHORTCUT COMMAND | | REJECT | MUTE | | REJECT SECOND INCOMING CALL | MUTE | | NEGATIVE ACKNOWLEDGMENT |
| 5-SECOND LONG PRESS | | PAIRING | PAIRING | | | | | | | | | |
| DOUBLE SHORT PRESS + LONG PRESS | | INITIALIZATION | | INITIALIZATION | | | | | | | | |
| 10-SECOND LONG PRESS | HARDWARE RESET | | | | | | | | | | | |

FIG. 6

| ATTACH SMALL TERMINAL TO CHARGING CASE | POWER OFF |
|---|---|
| PERFORM 10-SECOND LONG PRESS ON OPERATION UNIT | HARDWARE RESET |
| DETACH SMALL TERMINAL FROM CHARGING CASE | POWER ON |

FIG. 7

| OPERATION PATTERN | POWER OFF | NO CONNECTION | PAIRING | STANDBY | MUSIC PLAYBACK | INCOMING CALL | ONGOING CALL | OUTGOING CALL | SECOND INCOMING CALL | SECOND ONGOING CALL | SECOND OUTGOING CALL | VOICE OPERATION |
|---|---|---|---|---|---|---|---|---|---|---|---|---|
| WEAR SMALL TERMINAL IN EAR | | | | MESSAGE | | ANSWER | SWITCH TO SMALL TERMINAL | SWITCH TO SMALL TERMINAL | SWITCH FIRST ONGOING CALL TO SMALL TERMINAL | SWITCH TO SMALL TERMINAL | SWITCH TO SMALL TERMINAL | |
| REMOVE SMALL TERMINAL FROM EAR | | | | | | | SWITCH TO MOBILE PHONE | SWITCH TO MOBILE PHONE | SWITCH FIRST ONGOING CALL TO MOBILE PHONE | SWITCH TO MOBILE PHONE | SWITCH TO MOBILE PHONE | |

INFORMATION PROCESSING DEVICE

CROSS REFERENCE TO RELATED APPLICATIONS

This application is a continuation of U.S. application Ser. No. 15/417,591, filed Jan. 27, 2017 and claims the benefit of Japanese Priority Patent Application JP 2016-029069 filed Feb. 18, 2016, the entire contents of which are incorporated herein by reference.

BACKGROUND

The present disclosure relates to information processing devices.

In recent years, mobile communication networks that can be used by mobile phones have been widespread. In such a mobile communication network, a user can call by using the mobile phone. With regard to the mobile phones, small terminals to be connected with the mobile phones have been developed so as to improve convenience. The user also calls by using such a small terminal.

JP 2001-238262A discloses the small terminal. As the small terminal, JP 2001-238262A discloses an earpiece that is detachably attached to a mobile terminal that performs wireless communication with a base station. A user can call via the earpiece by removing the earpiece from the mobile terminal.

SUMMARY

With regard to the small terminal such as the earpiece connected with another device, it is preferable that operation is performed by simple movement of the user. Accordingly, embodiments of the present disclosure propose a novel and improved small terminal that performs a process based on an instruction transmitted from another device in accordance with a signal detected by a sensor of the small terminal.

According to an embodiment of the present disclosure, there is provided an information processing device including: a sensor configured to detect that the information processing device is worn on a part of a human body; a processing unit configured to process information; and a communication unit configured to communicate with another device. The processing unit transmits a signal to the another device on the basis of a detection signal detected by the sensor. The processing unit performs a process according to an instruction transmitted from the another device in accordance with the signal.

As described above, according to the embodiments of the present disclosure, a process based on an instruction transmitted from another device is performed in accordance with a signal detected by a sensor of the small terminal.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description is given in the following order.
1. System configuration
2. Configuration of small terminal
3. Operation of small terminal
4. Supplement
5. Conclusion

1. System Configuration

Figure 1:
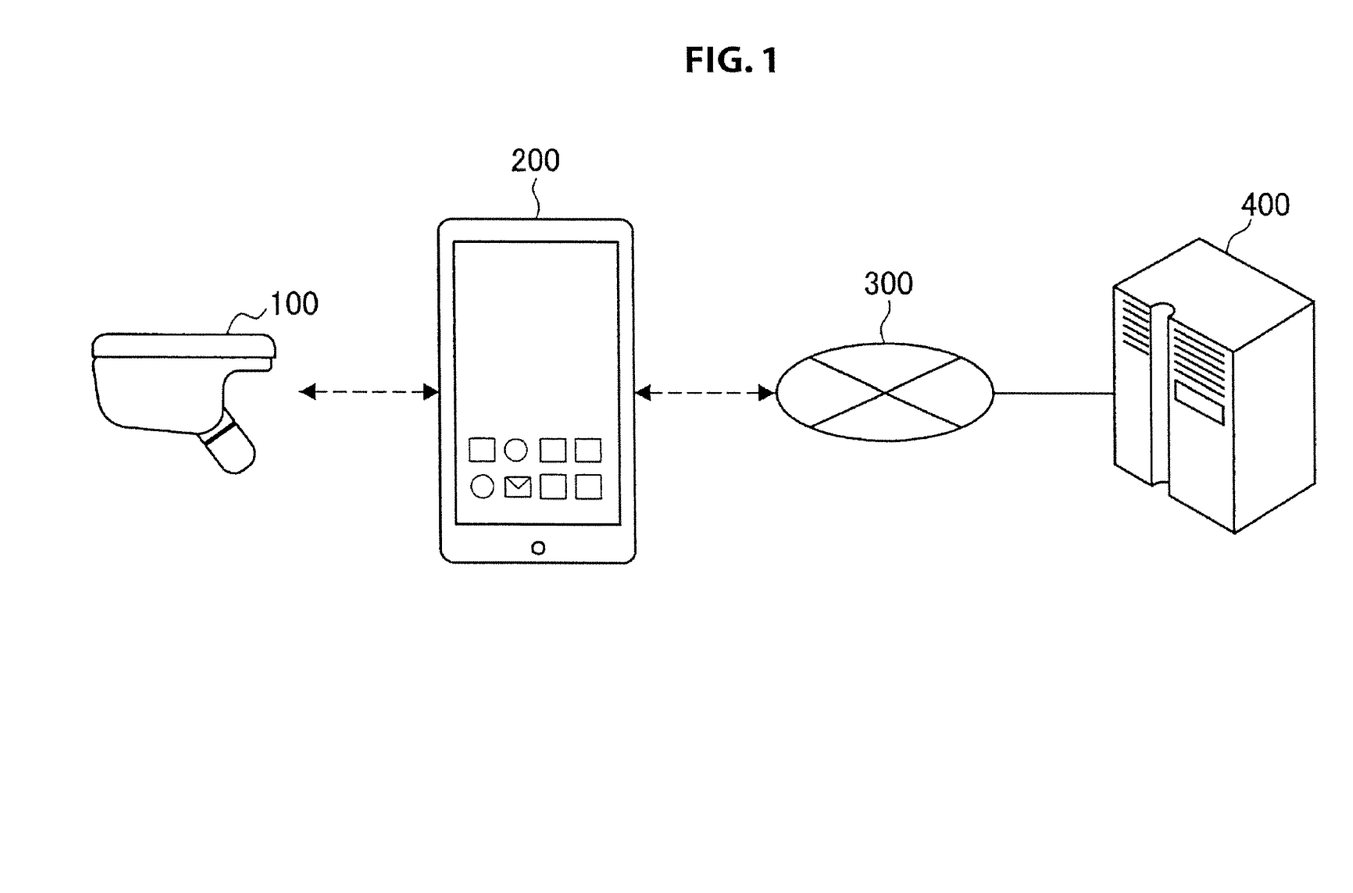
FIG. 1 is a diagram illustrating an example of a communication system according to an embodiment of the present disclosure.

FIG. 1 is a diagram illustrating a configuration of a communication system including a small terminal 100 according to an embodiment of the present disclosure. The communication system according to the embodiment of the present disclosure includes the small terminal 100, a mobile phone 200, a communication network 300, and a server 400. The small terminal 100 is a terminal to be worn in an ear of a user and to be connected with the mobile phone via near-field communication. The small terminal 100 according to the embodiment of the present disclosure includes a speaker. The user can call by using the small terminal 100. In addition, the small terminal 100 includes an operation unit. The user operates the operation unit and performs operation on various functions of the mobile phone 200. The small terminal 100 is an example of an information processing device that performs processes according to instructions from the mobile phone 200. Details of the small terminal 100 will be described later.

The mobile phone 200 includes a speaker and a microphone. The mobile phone 200 can call another terminal by communicating with the base station included in the mobile communication network. The mobile phone 200 includes a display unit configured to display information, and a touchscreen in the display unit. A user performs operation related to various functions of the mobile phone 200 by performing the operation on the touchscreen. A structural element to be used for operating the mobile phone 200 is not limited to the touchscreen. The structural element may be arrow keys, a hardware button, a jog dial, or the like.

The mobile phone 200 has various functions in addition to the call function. Some functions may be performed by communication with the server 400 via the communication network 300. The functions of the mobile phone 200 include photographing, music playback, a browsing function, e-mail, map display, and the like, for example.

The server 400 is connected with the mobile phone 200 via the communication network 300. The server 400 provides information corresponding to applications or the functions of the mobile phone 200. For example, the server 400 provides the mobile phone 200 with a web screen in the case where a user connects to the Internet via a browser of the mobile phone 200. On the other hand, the server 400 provides the mobile phone 200 with map information in the case where a user displays a map by using a map application of the mobile phone 200. The mobile phone 200 connects to severs 400 that are different from each other in accordance with respective applications, and acquires information.

2. Configuration of Small Terminal

Figure 2:
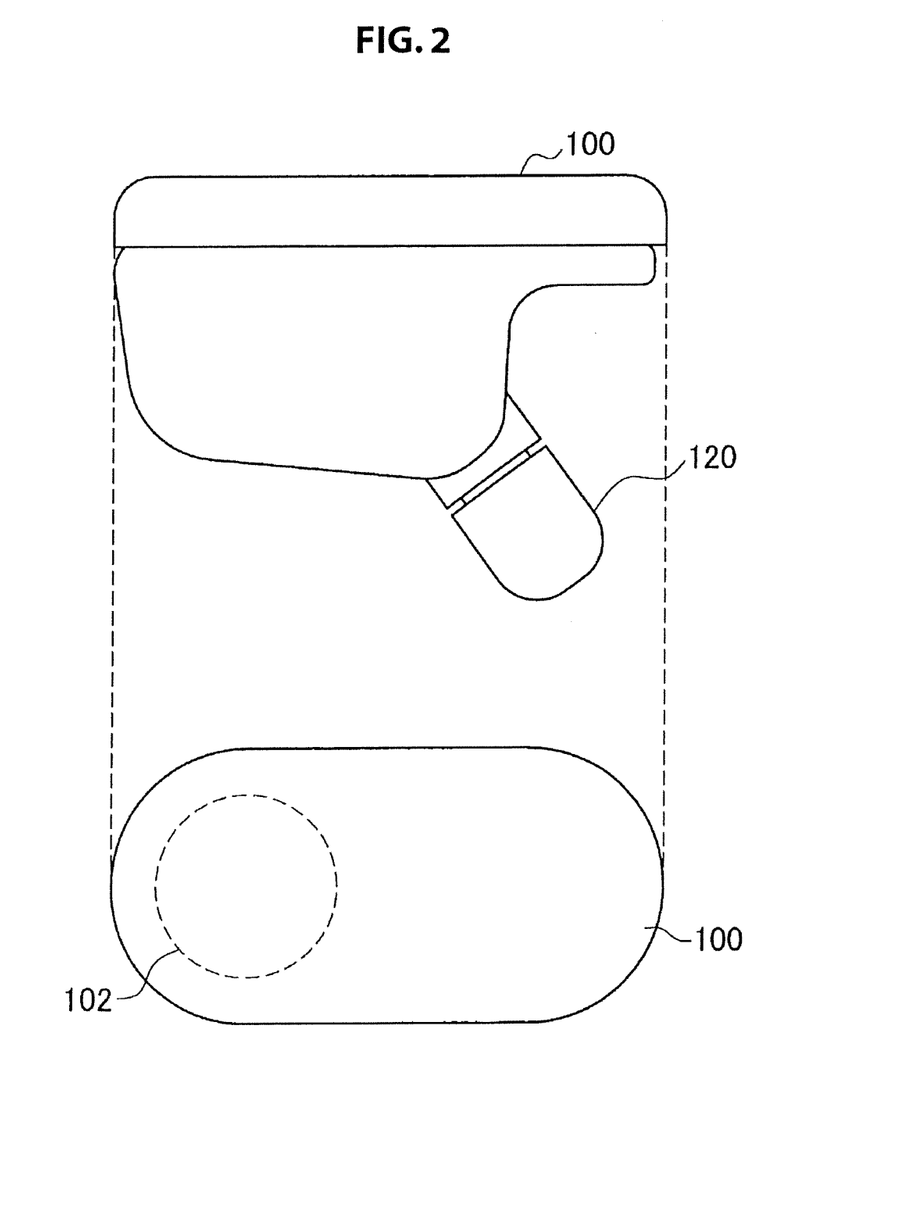
FIG. 2 is a diagram illustrating an example of external appearance of a small terminal according to an embodiment of the present disclosure.

The configuration of the communication system according to the embodiment of the present disclosure has been described. Next, a configuration of the small terminal 100 according to the embodiment of the present disclosure will be described. FIG. 2 is a diagram illustrating external appearance of the small terminal 100 according to an embodiment of the present disclosure. The small terminal 100 is a terminal to be worn in an ear of a user. The small terminal 100 has an insertion unit 120 to be inserted into the ear of the user. The small terminal 100 also has an operation unit 102 to receive operation from the user.

Figure 3:
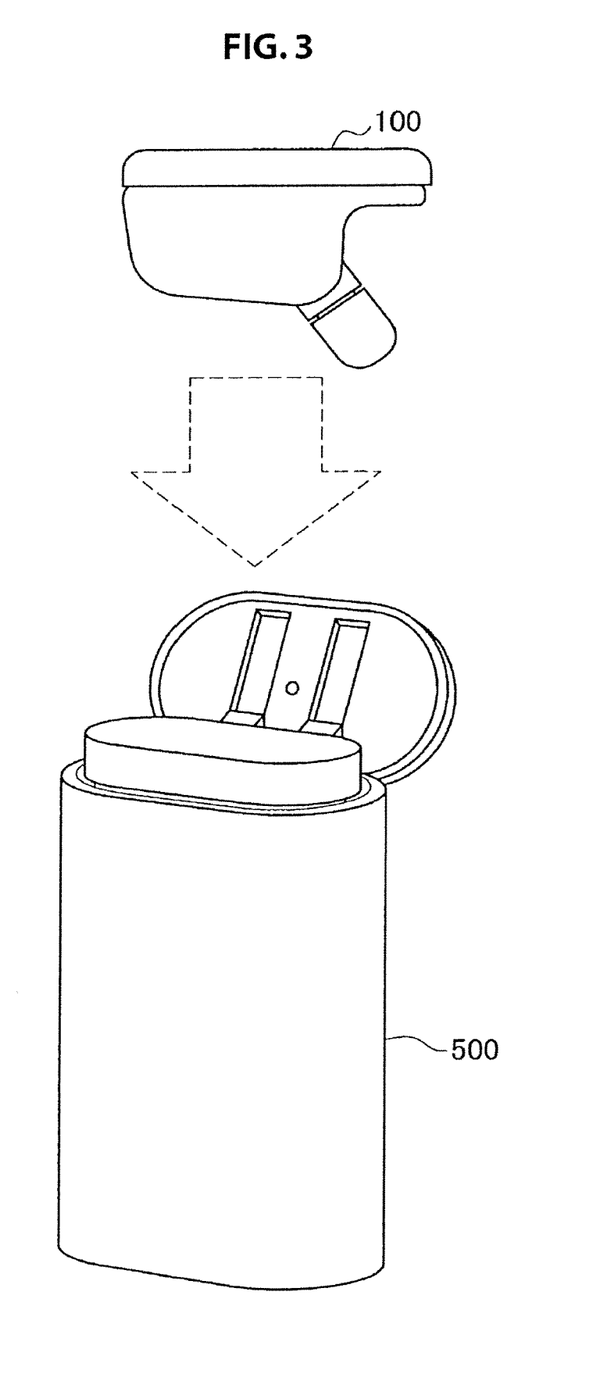
FIG. 3 is a diagram illustrating an example of a charging case by which a small terminal according to an embodiment of the present disclosure is charged.

FIG. 3 is a diagram illustrating a charging case 500 to be used for charging the small terminal 100. The charging case 500 has a magnetic sensor. When the small terminal 100 is placed on the charging case 500, the charging case 500 detects the small terminal 100 via the magnetic sensor. Subsequently, the charging case 500 starts to charge the small terminal 100 when detecting that the small terminal 100 is placed. Alternatively, the charging case 500 may start charging when detecting electric connection with a charging terminal of the small terminal 100. The charging case 500 has a built-in battery. The built-in battery can be charged via USB.

Figure 4:
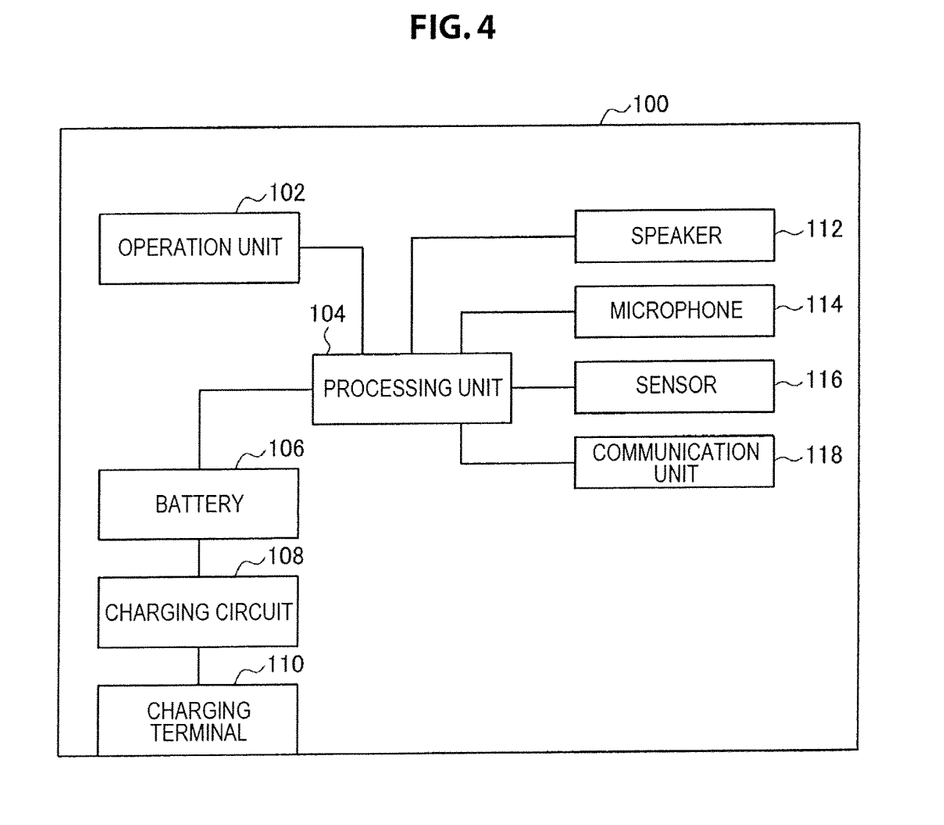
FIG. 4 is a block diagram illustrating an example of a configuration of a small terminal according to an embodiment of the present disclosure.

The external appearance of the small terminal 100 and the charging case 500 have been described above. Next, an internal configuration of the small terminal 100 will be described. FIG. 4 is a block diagram illustrating the internal configuration of the small terminal 100. The small terminal 100 includes the operation unit 102, a processing unit 104, a battery 106, a charging circuit 108, and a charging terminal 110. In addition, the small terminal 100 includes a speaker 112, a microphone 114, a sensor 116, and a communication unit 118.

A user can perform various kinds of operation on the operation unit 102. For example, the various operation methods performed by the user on the operation unit 102 include an operation method in which the user taps the operation unit 102 once and an operation method in which the user taps the operation unit 102 twice. In addition, the various operation methods performed by the user on the operation unit 102 include an operation method in which the user presses the operation unit 102 for a predetermined time period. The operation unit 102 may be an electrostatic touchscreen, a pressure sensitive touchscreen, or a physical key. The number of operation units 102 is not limited. One or a plurality of operation units 102 may be provided. However, it is preferable that the number of operation units 102 be small because the small terminal 100 according to the embodiment of the present disclosure is small and a space in which the operation units 102 are placed is limited.

The processing unit 104 is connected with the respective units of the small terminal 100, and process information from the respective units. For example, the processing unit 104 detects information related to operation performed by a user on the operation unit 102. In addition, the processing unit 104 processes sound data received from the mobile phone 200 via the communication unit 118, and outputs the processed sound data to the speaker 112. In addition, the processing unit 104 creates sound data by processing sound received by the microphone 114, and transmits the sound data to the mobile phone 200 via the communication unit 118. In addition, the processing unit 104 transmits a wearing signal to the mobile phone 200 on the basis of a detection signal detected by the sensor 116. The wearing signal indicates that the small terminal 100 is worn in an ear.

The charging terminal 110 is connected with a terminal of the charging case 500. The battery 106 accumulates electric power supplied from the charging terminal 110 via the charging circuit 108. The battery 160 supplies the accumulated electric power to the respective units of the small terminal 100. The respective units operate by using the supplied electric power.

The speaker 112 outputs sound on the basis of the sound data processed by the processing unit 104. For example, the speaker 112 outputs sound during a call on the basis of the sound data transmitted from the mobile phone 200 in the case where the call function is used in the mobile phone 200. The microphone 114 receives the sound and transmits the sound to the processing unit 104. For example, the microphone 114 receives spoken voice of a user and transmits a sound signal to the processing unit 104.

The sensor 116 detects that the small terminal 100 is worn in an ear of a user. For example, the sensor 116 may be a proximity sensor that can detect a target object without making physical contact with the target object. For example, the proximity sensor detects the detection target object by using infrared, ultrasound, or electromagnetic wave. In another example, a proximity sensor may detect a detection target object by using change in eddy currents due to electromagnetic induction or change in capacitance due to approach of the detection target object.

The communication unit 118 may communicate with another device such as the mobile phone 200 by using a near-field communication interface such as Bluetooth (registered trademark). The small terminal 100 uses the low-capacity battery 106. Therefore, it is preferable to use a power-saving wireless communication interface such as Bluetooth low energy. The communication unit 118 is not limited to the above described interfaces. The communication unit 118 may be a near-field communication interface such as ZigBee.

The small terminal 100 and the mobile phone 200 are paired and connected with each other. In the pairing, devices are searched for in a radio wave coverage area, and a device that the user wants to connect with is selected from the detected devices. With regard to the pairing, mutual authentication may be performed between the small terminal 100 and the mobile phone 200 by using a password. The mobile phone 200 and the small terminal 100 are paired in such a way, and thereby the mobile phone 200 and the small terminal 100 can communicate with each other.

3. Operation of Small Terminal

Figure 5:
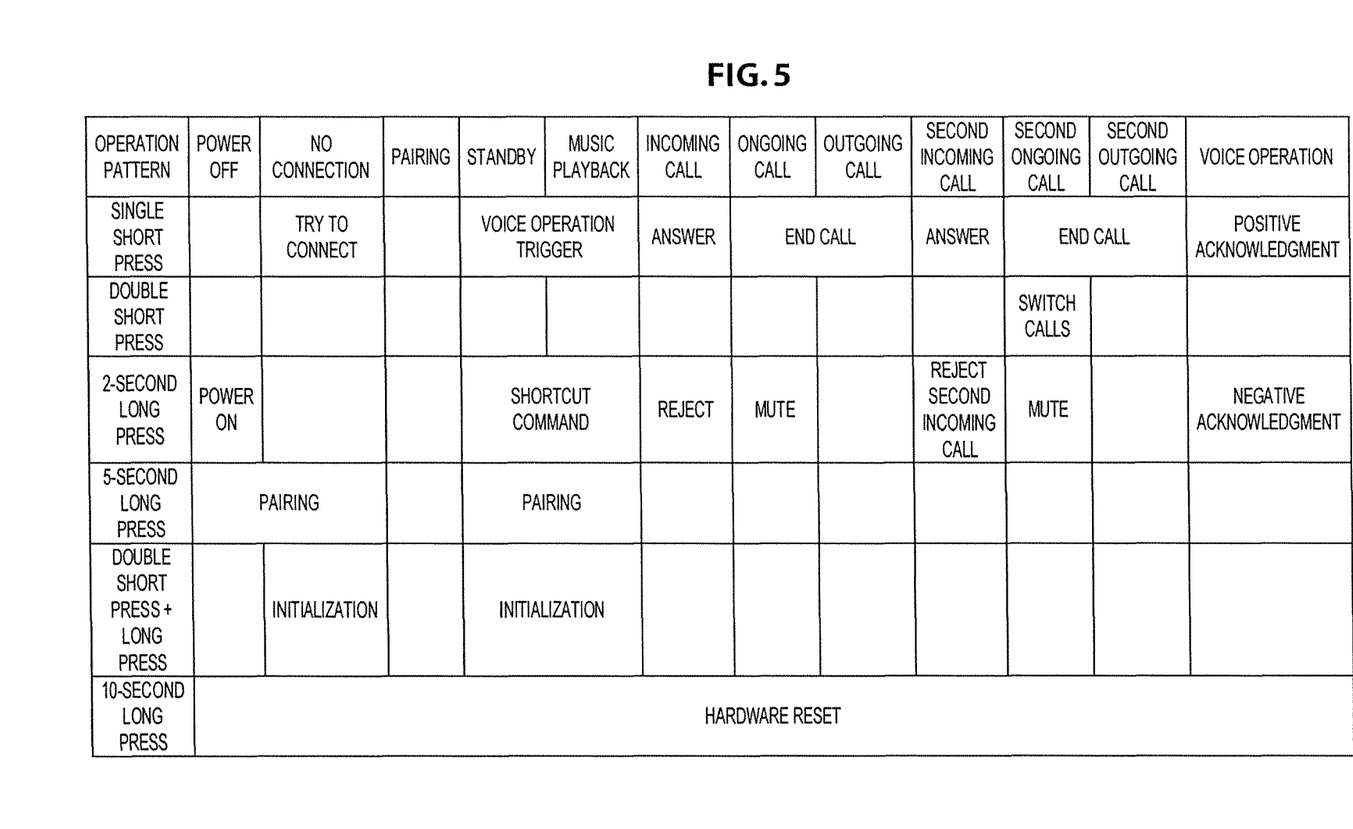
FIG. 5 is a diagram illustrating an example of operation methods of a small terminal according to an embodiment of the present disclosure.

The configuration of the small terminal 100 has been described above. Next, operation of the small terminal 100 will be described. FIG. 5 is a diagram illustrating an operation example when the operation unit 102 of the small terminal 100 is operated. An "operation pattern" row at the leftmost side indicates various operation methods to be performed on the operation unit 102 of the small terminal 100. Various states in the uppermost column indicate states of the small terminal 100 or the mobile phone 200 or processes performed in the small terminal 100 or the mobile phone 200. Hereinafter, operation of the small terminal 100 will be described with reference to FIG. 5.

(Operation Pattern)

The operation patterns of the operation unit 102 of the small terminal 100 illustrated in FIG. 5 includes "single short press", "double short press", "two-second long press", "five-second long press" "double short press+long press", and "ten-second long press". However, the operation patterns of the operation unit 102 are not limited thereto. In addition, the number of times of the short presses and the number of seconds of the long press are not limited to the number of times and seconds to be described below, and other values may be used.

When the user presses the operation unit 102 of the small terminal 100 according to the embodiment of the present disclosure, the processing unit 104 starts to measure how much time elapses after the operation unit 102 is pressed. The "single short press" is detected when a finger of the user is released from the operation unit 102 within 1000 ms from the time the user presses the operation unit 102, and the user does not press the operation unit 102 again within 500 ms from the time the finger of the user is released from the operation unit 102.

The "double short press" is detected when a finger of the user is released from the operation unit 102 within 1000 ms from the time the user presses the operation unit 102 (first time), the user presses the operation unit 102 again (second time) within 500 ms from the time the finger of the user is released from the operation unit 102, and then the finger of the user is released from the operation unit 102 again.

The "two-second long press" is detected when a finger of the user is not released from the operation unit 102 within 2000 ms from the time the user presses the operation unit 102. The "five-second long press" is detected when a finger of the user is not released from the operation unit 102 within 5000 ms from the time the user presses the operation unit 102. The "ten-second long press" is detected when a finger of the user is not released from the operation unit 102 within 10000 ms from the time the user presses the operation unit 102. To represent the long presses of various seconds, the small terminal 100 may output a confirmation sound from the speaker 112 when the small terminal 100 detects each of the long press operations. The small terminal 100 may output various confirmation sounds depending on the respective long press operations of various seconds.

The "double short press+long press" is detected when the finger of the user is released again from the operation unit 102 within 1000 ms from the time the second short press is performed on the operation unit 102 by the user in the "double short press", the user presses the operation unit 102 again (third time) within 500 ms from the time when the finger of the user is released again, and then the finger of the user is not released from the operation unit 102 for 5000 ms.

(3. Status of Small Terminal)

The operation patterns of the operation unit 102 of the small terminal 100 have been described above. Next, operation states of the small terminal 100 will be described. As described above, the uppermost column in FIG. 5 indicates operation states of the small terminal 100 or the mobile phone 200. In FIG. 5, an example of the operation states of the small terminal 100 includes "power off", "no connection", "pairing", "standby", and "music playback". In addition, in FIG. 5, an example of the operation states of the small terminal 100 includes "incoming call", "ongoing call", "outgoing call", "second incoming call", "second ongoing call", "second outgoing call", and "voice operation". Hereinafter, the respective states will be described.

The "power off" state is a state where the small terminal 100 is powered off. The power of the small terminal 100 may be turned off when the small terminal 100 is not connected with another device and the small terminal 100 is not operated for a predetermined time in the case where the small terminal 100 does not have a power switch. Alternatively, the power of the small terminal 100 may be turned off in the case where the small terminal 100 is connected with the charging case 500. The "no connection" state is a state where the small terminal 100 or the mobile phone 200 (or another device) is not in standby.

The "pairing" state is a state where the small terminal 100 is in a mode for establishing the above described pairing. When the small terminal 100 enters the pairing mode, the small terminal 100 can be detected by the mobile phone 200. When a user selects the small terminal 100 by using the mobile phone 200, the small terminal 100 and the mobile phone 200 are paired. The "standby" state is a state where the small terminal 100 and the mobile phone 200 are paired and can communicate with each other. The "music playback" is a state where a music application is activated in the mobile phone 200 and small terminal 100 is outputting sound from the speaker 112 on the basis of music data transmitted from the mobile phone 200.

The "incoming call" state is a state where the mobile phone 200 connected with the small terminal 100 is receiving incoming call from another device. The "ongoing call" state is a state where a call is ongoing in the mobile phone 200 connected with the small terminal 100 by using a calling application or the like. In the "ongoing call" state, the small terminal 100 is receiving sound data of the call from the mobile phone 200 and transmitting sound data received through the microphone 114 to the mobile phone 200. The "outgoing call" state is a state where the mobile phone 200 connected with the small terminal 100 is making an outgoing call to another device.

The "second incoming call" state is a state where the mobile phone 200 connected with the small terminal 100 is receiving a second incoming call from a second terminal while the first call with s first terminal is ongoing, for example. The "second ongoing call" state is a state where the first call is put on hold and a second call is ongoing in the mobile phone 200 connected with the small terminal 100, for example. For example, the "second outgoing call" state is a state where the mobile phone 200 connected with the small terminal 100 is making a second outgoing call to the second terminal while the first call with the first terminal is ongoing.

The "voice operation" state is a state where the mobile phone 200 connected with the small terminal 100 is waiting for a voice instruction from a user. For example, in the "voice operation" state, the mobile phone 200 may issue a voice instruction to a user. For example, while an e-mail application is activated, the mobile phone 200 may output voice "do you want to respond to the e-mail?" to a user. To issue the voice instruction from the mobile phone 200, the small terminal 100 receives sound data from the mobile phone 200, and outputs sound based on the sound data from the speaker 112.

In the "voice operation" state, the small terminal 100 may receive voice of a user via the microphone 114, and may transmit sound data based on the received voice to the mobile phone 200. The mobile phone 200 may receive the sound data of the user, perform speech recognition on the received sound data, and determine that the sound data is an instruction from the user. For example, in the case where the user says "yes", the small terminal 100 transmits the sound data to the mobile phone 200, and the mobile phone 200 performs the speech recognition on the sound data, and determines that the user has made a positive acknowledgment. In other words, in the case where the mobile phone 200 asks a question "do you want to respond to the e-mail?" to the user, the mobile phone 200 determines that the user has made the positive acknowledgment when the user says "yes" by voice. Subsequently, the mobile phone 200 may activate an e-mail creation screen for responding to the e-mail and ask another question "please input a response message" by voice, for example. In another example, the small terminal 100 may perform the speech recognition and transmit data based on the speech recognition to the mobile phone 200.

(Operation of Small Terminal Based on Respective Operation Patterns)

The operation patterns of the operation unit 102 of the small terminal 100 and the states of the small terminal 100 have been described above. Next, operation of the small terminal 100 or the mobile phone 200 according to the operation patterns of the operation unit 102 in the respective states will be described. When a user performs respective operations on the operation unit 102, the small terminal 100 may transmit operation signals according to respective operation methods to the mobile phone 200 connected with the small terminal 100. When the mobile phone 200 receives the operation signal, the mobile phone 200 performs operation according to the received operation signal and an activated application, and the small terminal 100 performs a process according to an instruction from the mobile phone 200.

First, operation of the small terminal 100 or the mobile phone 200 in the case where the user performs the "single short press" operation on the operation unit 102 will be described. In the case where the small terminal 100 is in the "no connection" state, the small terminal 100 tries to connect with the mobile phone 200 (or another device) when the user performs the single short press operation on the operation unit 102.

In the case where the small terminal 100 is in the "standby" state or the "music playback" state, it becomes possible to operate the mobile phone 200 connected with the small terminal 100 by voice when the user performs the single short press operation on the operation unit 102. For example, to perform the voice operation, the microphone 114 of the small terminal 100 is activated. When the user issues a voice instruction, the small terminal 100 transmits sound data of the voice instruction to the mobile phone 200. The mobile phone 200 receives the sound data, performs the speech recognition on the sound data, and performs operation based on the instruction from the user. The mobile phone 200 may transmit an additional instruction to the small terminal 100. In the case where the small terminal 100 is in the "standby" state or the "music playback" sate, the single short press operation performed on the operation unit 102 by the user may be valid only when the small terminal 100 is worn in an ear of the user.

In the case where the mobile phone 200 is receiving the "incoming call", the mobile phone 200 answers the incoming call when the user performs the single short press operation on the operation unit 102. When the mobile phone 200 answers the incoming call, sound data of the call is transmitted to the small terminal 100. The small terminal 100 receives the sound data and/or an indication that there is the incoming call from the mobile phone 200, processes the sound data, and outputs sound from the speaker 112. In the case where the small terminal 100 or the mobile phone 200 is in the "ongoing call" state or the "outgoing call" state, the mobile phone 200 end the call when the user performs the single short press operation on the operation unit 102.

In the case where the mobile phone 200 is receiving the "second incoming call", the mobile phone 200 answers the second incoming call when the user performs the single short press operation on the operation unit 102. At this time, the first incoming call may be ended or may be put on hold.

In the case where the small terminal 100 or the mobile phone 200 is in the "second ongoing call" state or the "second outgoing call" state, the mobile phone 200 ends the second ongoing call or the second outgoing call when the user performs the single short press operation on the operation unit 102. At this time, the mobile phone 200 may return to the first ongoing call that has been put on hold. When the second ongoing call or the second outgoing call ends, the small terminal 100 receives an indication that the second ongoing call or the second outgoing call has ended from the mobile phone 200, and stops outputting sound from the speaker 112. In the case where the mobile phone 200 returns to the first ongoing call that has been put on hold from the second ongoing call, the small terminal 100 outputs sound of the first ongoing call from the speaker 112.

In the case where the "voice operation" is performed on the mobile phone 200, the mobile phone 200 recognizes the positive acknowledgment when the user performs the single short press operation on the operation unit 102. As described above, the user can perform the voice operation in the "voice operation" state. However, sometimes the voice response is not appropriate depending on circumstances around the user (for example, in train).

In such a case, the user performs the single short press operation on the operation unit 102 to make the positive acknowledgment to the mobile phone 200. In other words, the user performs the single short press operation on the operation unit 102 to make the positive acknowledgment in the case where the mobile phone 200 asks the question "do you want to respond to the e-mail?" as described above, for example. The small terminal 100 transmits an operation signal of the single short press to the mobile phone 200, and the mobile phone 200 recognizes the positive acknowledgment on the basis of the operation signal. Subsequently, the mobile phone 200 may activate the e-mail creation screen for responding to an e-mail. In the case where the small terminal 100 or the mobile phone 200 is in the "voice operation" sate, the single short press operation performed on the operation unit 102 by the user may be valid only when the small terminal 100 is worn in an ear of the user.

The operation of the small terminal 100 or the mobile phone 200 in response to the single short press operation has been described. Next, operation of the small terminal 100 or the mobile phone 200 in response to the double short press operation will be described.

In the case where the small terminal 100 or the mobile phone 200 is in the "second ongoing call" state, the mobile phone 200 switches calls when the user performs the double short press operation on the operation unit 102. In other words, the mobile phone 200 ends the second ongoing call or puts the second ongoing call on hold, and returns to the first ongoing call that has been put on hold. The small terminal 100 receives an indication that the second ongoing call has ended from the mobile phone 200, and stops outputting sound from the speaker 112.

The operation of the small terminal 100 or the mobile phone 200 in response to the double short press operation has been described above. Next, operation of the small terminal 100 or the mobile phone 200 in response to the two-second long press operation will be described.

In the case where the small terminal 100 is in the "power off" state, the small terminal 100 is powered on when the user performs the two-second long press operation on the operation unit 102. In the case where the small terminal 100 is in the "standby" state or the "music playback" state, a shortcut command is executed when the user performs the two-second long press operation on the operation unit 102. Here, the shortcut command is a predetermined operation set by the user. For example, as the shortcut command, the user can set operation such as "message", "outgoing call", or "e-mail" to be described later with reference to FIG. 8. In the case where the small terminal 100 is in the "standby" state or the "music playback" sate, the two-second long press operation performed on the operation unit 102 by the user may be valid only when the small terminal 100 is worn in an ear of the user.

Next, in the case where the mobile phone 200 is receiving the "incoming call", the mobile phone 200 rejects the incoming call when the user performs the two-second long press operation on the operation unit 102. In the case where the mobile phone 200 is in the "ongoing call" state, the mobile phone 200 puts the speaker 112 on mute when the user performs the two-second long press operation on the operation unit 102. The small terminal 100 receives the muting instruction from the mobile phone 200, and stops outputting sound from the speaker 112.

Next, in the case where the mobile phone 200 is receiving the "second incoming call", the mobile phone 200 rejects the second incoming call when the user performs the two-second long press operation on the operation unit 102. On the other hand, in the case where the mobile phone 200 is in the "second ongoing call" state, the mobile phone 200 puts the speaker 112 on mute when the user performs the two-second long press operation on the operation unit 102. The small terminal 100 receives the muting instruction from the mobile phone 200, and stops outputting sound from the speaker 112.

In the case where the "voice operation" is performed on the mobile phone 200, the mobile phone 200 recognizes the negative acknowledgment when the user performs the two-second long press operation on the operation unit 102. In the case where the small terminal 100 is in the "voice operation" sate, the two-second long press operation performed on the operation unit 102 by the user may be valid only when the small terminal 100 is worn in an ear of the user.

The operation of the small terminal 100 or the mobile phone 200 in response to the two-second long press operation has been described above. Next, operation of the small terminal 100 or the mobile phone 200 in response to the five-second long press operation will be described.

In the case where the small terminal 100 is in the "power off" state, the "no connection" state, the "standby" state, or the "music playback" state, the small terminal 100 enters the pairing mode when the user performs the five-second long press operation on the operation unit 102.

The operation of the small terminal 100 or the mobile phone 200 in response to the five-second long press operation has been described above. Next, operation of the small terminal 100 or the mobile phone 200 in response to the double short press+long press operation will be described.

In the case where the small terminal 100 is in the "no connection" state, the "standby" state, or the "music playback" state, the small terminal 100 performs initialization when the user performs the double short press+long press operation on the operation unit 102. In the initialization, settings and data stored in the small terminal 100 are deleted, for example.

The operation of the small terminal 100 or the mobile phone 200 in response to the double short press+long press operation has been described above. Next, operation of the small terminal 100 or the mobile phone 200 in response to the ten-second long press operation will be described. When the user performs the ten-second long press operation on the operation unit 102, the small terminal 100 performs hardware reset in any state. Thereby, the small terminal 100 is reset to factory settings.

As described above, by operating the operation unit 102 of the small terminal 100 using the various operation methods, the user can issue various instructions to the mobile phone 200. This enables the user to perform various operations on various applications without operating the mobile phone 200. This function is effective in such a case where the mobile phone 200 is in a bag of the user.

Figure 6:
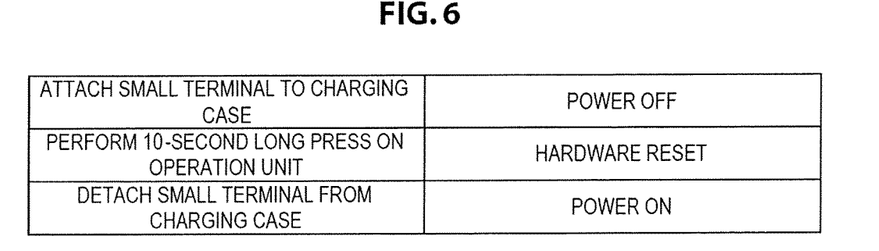
FIG. 6 is a diagram illustrating an example of operation performed when a small terminal according to an embodiment of the present disclosure is connected with or removed from a charging case.

The operation methods of the small terminal 100 or the mobile phone 200 in response to the various operation methods performed on the operation unit 102 by the user have been described above. Next, operation of the small terminal 100 when the small terminal 100 is attached to or detached from the charging case 500 will be described.

FIG. 6 is a diagram illustrating operation of the small terminal 100 when the small terminal 100 is attached to or detached from the charging case 500. When the small terminal 100 is attached to the charging case 500, the small terminal 100 in any state enters the power off state. In this case, the small terminal 100 may transmit a charging state signal to the mobile phone 200. The charging state signal indicates that the small terminal 100 is connected with the charger. When the mobile phone 200 receives the charging state signal, the mobile phone 200 may disconnect the connection with the small terminal 100. Even in the case where the small terminal 100 is attached to the charging case 500, the small terminal 100 performs hardware reset when the user performs the ten-second long press operation on the operation unit 102 in a way similar to the case where the small terminal 100 is not attached to the charging case 500. When the small terminal 100 is detached from the charging case 500, the small terminal 100 enters a power on state.

Figure 7:
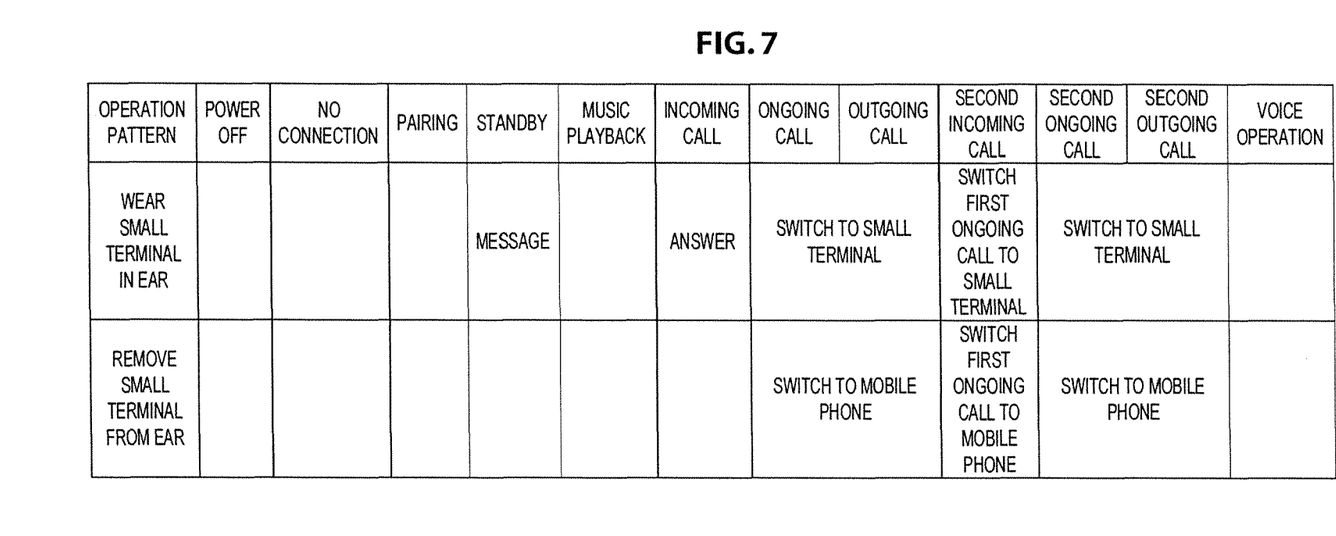
FIG. 7 is a diagram illustrating an example of operation performed when a small terminal according to an embodiment of the present disclosure is worn in or removed from an ear.

The operation of the small terminal 100 in response to attachment or detachment of the small terminal 100 to or from the charging case 500 has been described above. Next, operation of the small terminal 100 in response to wearing or removal of the small terminal 100 in or from an ear of the user will be described.

When wearing the small terminal 100 in an ear of the user, the small terminal 100 transmits a wearing signal to the mobile phone 200 connected with the small terminal 100. The wearing signal indicates that the small terminal 100 is worn in the ear. When the mobile phone 200 receives the wearing signal, the mobile phone 200 recognizes that the small terminal 100 is worn in the ear of the user. When removing the small terminal 100 from the ear of the user, the small terminal 100 transmits a removal signal to the mobile phone 200 connected with the small terminal 100. The removal signal indicates that the small terminal 100 is removed from the ear. When the mobile phone 200 receives the removal signal, the mobile phone 200 recognizes that the small terminal 100 is removed from the ear of the user.

FIG. 7 is a diagram illustrating operation of the small terminal 100 in response to wearing or removal of the small terminal 100 in or from an ear of the user. When wearing the small terminal 100 in an ear in the case where the small terminal 100 is in the "standby" state, the small terminal 100 receives a message from the mobile phone 200. Details of the message will be described later with reference to FIG. 8. Subsequently, the small terminal 100 outputs the message received from the mobile phone 200 to the speaker 112.

When wearing the small terminal 100 in an ear in the case where the small terminal 100 or the mobile phone 200 is in the "incoming call" state, the mobile phone 200 answers the incoming call. On the other hand, when wearing the small terminal 100 in an ear in the case where the small terminal 100 or the mobile phone 200 is in the "ongoing call" state or the "outgoing call" state, the mobile phone 200 switch devices. More specifically, when the mobile phone 200 receives the wearing signal in the "ongoing call" state, the mobile phone 200 switches devices so as to output sound of the ongoing call from the small terminal 100.

When wearing the small terminal 100 in an ear in the case where the small terminal 100 or the mobile phone 200 is receiving the "second incoming call", the mobile phone 200 switches the first ongoing call to the small terminal 100. At this time, sound of the second incoming call may be output from the mobile phone 200. On the other hand, when wearing the small terminal 100 in an ear in the case where the small terminal 100 or the mobile phone 200 is in the "second ongoing call" state or the "second outgoing call" state, the mobile phone 200 switches a the second ongoing call to the small terminal 100.

The operation of the small terminal 100 when wearing the small terminal 100 in an ear of a user has been described above. Next, operation of the small terminal 100 when removing the small terminal 100 from an ear of a user will be described.

When removing the small terminal 100 from the ear in the case where the small terminal 100 or the mobile phone 200 is in the "ongoing call" state or the "outgoing call" state, the mobile phone 200 switch devices. More specifically, the mobile phone 200 receives the removal signal from the small terminal 100, and switches devices so as to output sound of the ongoing call from the mobile phone 200.

When removing the small terminal 100 from the ear in the case where the small terminal 100 or the mobile phone 200 is receiving the "second incoming call", the mobile phone 200 switches the first ongoing call to the mobile phone 200. At this time, sound of the second incoming call may be output from the small terminal 100. When removing the small terminal 100 from an ear in the case where the small terminal 100 or the mobile phone 200 is in the "second ongoing call" state or the "second outgoing call" state, the mobile phone 200 switches the second ongoing call to the mobile phone 200.

As described above, the small terminal 100 according to the embodiment of the present disclosure transmits the signals to the mobile phone 200. The signals indicate that the small terminal 100 is worn in or removed from an ear of a user. This enables the user to answer the incoming call or end the ongoing call by wearing or removing the small terminal 100, for example. The user can operate the mobile phone 200 by making such a simple movement. In addition, the user movement for wearing the small terminal 100 in an ear or the user movement for removing the small terminal 100 from the ear occurs less error than the user movement for operating the operation unit 102. Accordingly, the erroneous operation on important functions can be reduced by assigning important operation in an application (for example, answering the call or ending the call) to the user movements for wearing or removing the small terminal 100.

Figure 8:
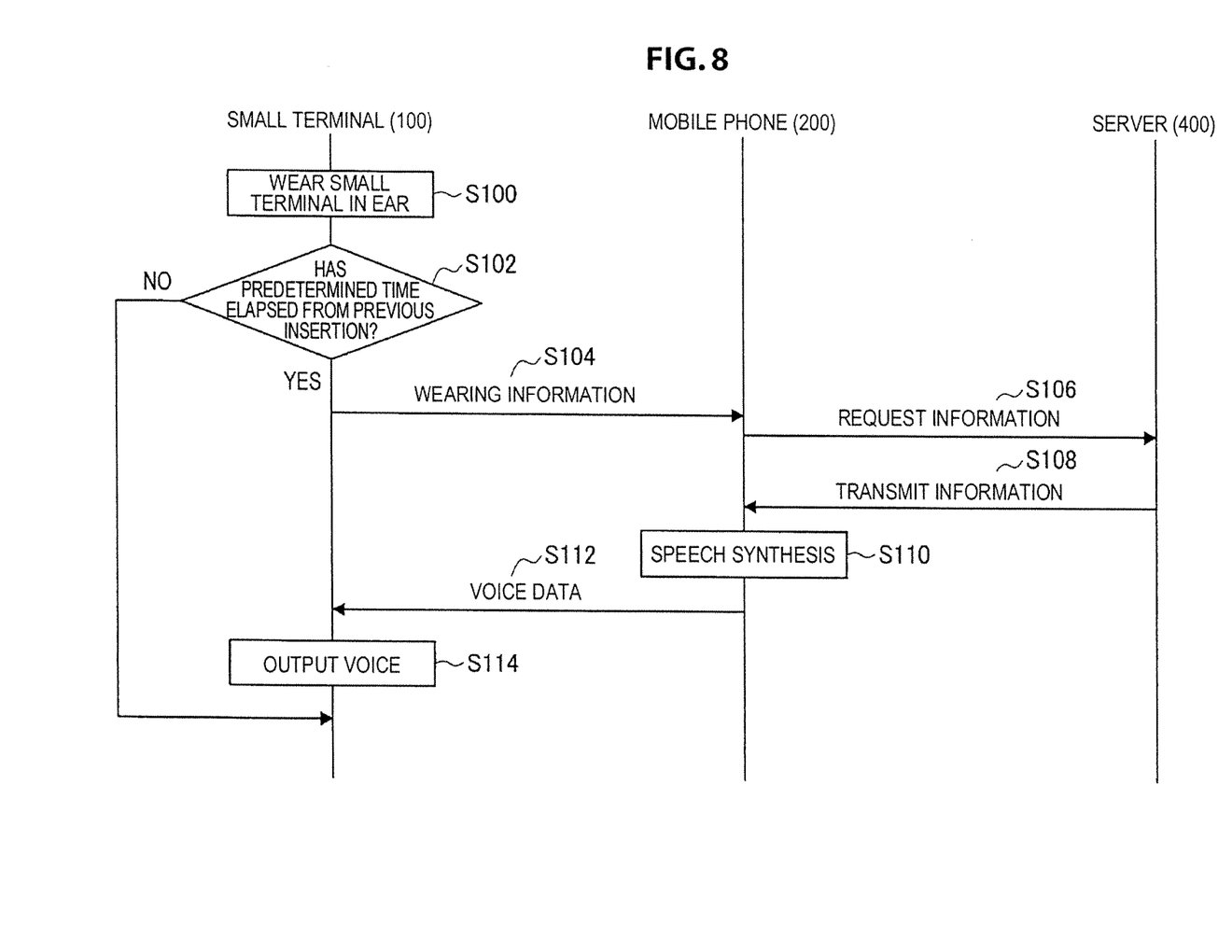
FIG. 8 is a flowchart illustrating an example of operation to acquire information by using a small terminal according to an embodiment of the present disclosure.

The operation of the small terminal 100 when removing the small terminal 100 from an ear of a user has been described. Next, operation of the "message" will be described. FIG. 8 is a process workflow illustrating the operation of the "message".

In the "message" operation, the small terminal 100 is worn in an ear of a user in S100. Next, in S102, it is determined whether a predetermined time has elapsed from previous insertion of the small terminal 100 (in other words, from previous removal of the small terminal 100). In the case where it is determined that the predetermined time has not elapsed from the previous insertion of the small terminal 100 in S102, the process ends.

In the case where it is determined that the predetermined time has elapsed from the previous insertion of the small terminal 100 in S102, the process proceeds to S104, and the small terminal 100 transmits wearing information to the mobile phone 200. The mobile phone 200 receives the wearing information, and requests information from the server 400. The information requested by the mobile phone 200 is set by a user. The information includes information on weather, traffic information, and information on news, for example.

Next, the server 400 transmits the requested information to the mobile phone 200 in S108. At this time, the information transmitted to the mobile phone 200 in S108 is textual information. Next, the mobile phone 200 receives the textual information from the server 400 and performs speech synthesis in S110. The speech synthesis is a process for converting the received textual information to voice data.

Next, in S112, the mobile phone 200 transmits the converted voice data to the small terminal 100. Subsequently, in S114, the small terminal 100 processes the received voice data and outputs voice via the speaker 112.

A purpose of determining whether the predetermined time has elapsed from the previous insertion of the small terminal 100 in S102 is to avoid repeated message playback in the case where the user accidentally drops the small terminal 100 and immediately wears the small terminal 100 again. In the case where the user accidentally drops the small terminal 100 and immediately wears the small terminal 100 again, the message playback starts from a part of the message whose playback is paused due to accidental removal of the small terminal 100. Such a process is achieved by the small terminal 100 or the mobile phone 200 that stores the voice data transmitted or received in S112.

In another example, the determination in S102 may be performed by the mobile phone 200. More specifically, when wearing the small terminal 100 in an ear in S100, the small terminal 100 transmits the wearing information to the mobile phone 200. Next, the mobile phone 200 determines whether a predetermined time has elapsed from previous insertion of the small terminal 100 on the basis of last time the wearing information is received from the small terminal 100. Subsequent process is similar to the above described process.

The information requested in the "message" operation is not limited to the information requested from the server 400. For example, the requested information may be information on a schedule stored in the mobile phone 200. Alternatively, the requested information may vary according to time slots. For example, in the case where the small terminal 100 is worn from 6:00 a.m. to 8:00 a.m., information on weather and a schedule is requested. In the case where the small terminal 100 is worn from 5:00 p.m. to 8:00 p.m., traffic information and information on news may be requested. In such a way, information desired by a user is appropriately acquired in accordance with time slots since the requested information varies according to the time slots.

The operation example in which the small terminal 100 transmits the operation signal, the wearing signal, the charge state signal, or the like to the mobile phone 200 and it is determined what kind of operation is mainly performed by the mobile phone 200 that has received such a signal has been described above.

However, it is also possible that it is determined what kind of an application or a process the small terminal 100 is performing, and instructions are transmitted so that the mobile phone 200 executes various processes. For example, the small terminal 100 may determine what kind of operation has been performed on the operation unit 102, and may transmit an instruction to the mobile phone 200, the instruction causing the mobile phone 200 to perform various processes according to states of the small terminal 100.

Here, detailed description will be provided with reference to FIG. 5. For example, when the single short press operation is performed on the operation unit 102 in the case where the small terminal 100 is in the "standby" state, the small terminal 100 may transmit an instruction to the mobile phone 200 so as to enable voice operation.

Alternatively, the small terminal 100 may determine that the small terminal 100 is worn in an ear, and may transmit an instruction to the mobile phone 200, the instruction causing the mobile phone 200 to perform various processes according to states of the small terminal 100. For example, when wearing the small terminal 100 in an ear in the case where the small terminal 100 is in the "ongoing call" state, the small terminal 100 transmits an instruction to the mobile phone 200 so as to cause the mobile phone 200 to transmit sound data of the ongoing call to the small terminal 100.

In addition, in the "message" operation illustrated in FIG. 8, the small terminal 100 may determines a time slot or may determine whether a predetermined time has elapsed from previous removal of the small terminal 100, and may transmit an instruction to the mobile phone 200 to acquire appropriate information.

4. Supplement

It should be understood by those skilled in the art that various modifications, combinations, sub-combinations and alterations may occur depending on design requirements and other factors insofar as they are within the scope of the appended claims or the equivalents thereof.

For example, a relation between the operation methods and the states of the small terminal 100 described with reference to FIG. 5 is not limited to the relation illustrated in FIG. 5. For example, the operation in response to the single short press may be performed in response to the double short press. In addition, the operation methods are not limited to the methods illustrated in FIG. 5. The two-second long press may be replaced with triple short press. In another example, the double short press+long press operation may be replaced with seven-second long press, or may be replaced with the triple short press. In yet another example, as described above, the number of seconds for which the operation unit 102 is pressed is not limited to two seconds, five seconds, or ten seconds. The number of seconds may be set to longer seconds such as three seconds, seven seconds, or 15 seconds. This can surely reduce possibility of erroneous operation.

It may be possible to provide a computer program for causing the processing unit 104 to operate as described above. Moreover, it may be possible to provide a recording medium having the computer program stored therein.

5. Conclusion

As described above, the small terminal according to the embodiment of the present disclosure transmits operation signals to the mobile phone 200 in accordance with the plurality of the operation methods. The mobile phone receives the operation signal, and performs a process according to the operation or an application. In addition, the small terminal according to the embodiment of the present disclosure transmits the wearing signal to the mobile phone. The wearing signal indicates that the small terminal is worn in an ear. The mobile phone receives the wearing signal, and performs a process according to the operation or an application. As described above, the small terminal according to the embodiment of the present disclosure transmits the operation signals or the wearing signal, and the mobile phone operates in response to the received signals. This enables various operations to be performed in the mobile phone with various functions by using the small terminal.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1) An information processing device including:

a sensor configured to detect that the information processing device is worn on a part of a human body;

a processing unit configured to process information; and a communication unit configured to communicate with another device, wherein the processing unit transmits a signal to the another device on the basis of a detection signal detected by the sensor, and the processing unit performs a process according to an instruction transmitted from the another device in accordance with the signal.

(2) The information processing device according to (1), wherein, as the signal, the processing unit transmits a wearing signal to the another device, the wearing signal indicating that the information processing device is worn on a part of a human body.

(3) The information processing device according to (1), further including an operation unit, wherein the processing unit detects a plurality of operation methods of the operation unit, and the processing unit transmits an operation signal according to the operation method detected as the signal, to the another device.

(4) The information processing device according to (2) or (3), wherein the processing unit transmits the wearing signal to the another device in a case where the processing unit determines that the information processing device is worn on a part of a human body after predetermined time elapses from when the information processing device is removed from a part of a human body.

(5) The information processing device according to (1), wherein the processing unit transmits, to the another device, an instruction that causes the another device to perform a process varying on the basis of whether or not the information processing device is worn on a part of a human body.

(6) The information processing device according to (1), further including an operation unit, wherein the processing unit detects a plurality of operation methods of the operation unit, and the processing unit transmits, to the another device, an instruction that causes the another device to perform a process varying on the basis of the detected methods.

(7) The information processing device according to (1), wherein the processing unit transmits, to the another device, an instruction that causes the another device to acquire information, in a case where the processing unit determines that the information processing device is worn on a part of a human body after predetermined time elapses from when the information processing device is removed from a part of a human body.

(8) The information processing device according to (1), wherein the part of the human body is an ear.

What is claimed is:

1. An electronic device comprising:
   a communication interface configured to communicate with another device via a network; and
   a processor configured to
      determine, based on an output of a sensor, whether the electronic device is worn on a part of a human body; and
      control the communication interface to transmit a message to the another device via the network in a case that it is determined that the electronic device is worn on a part of a human body after predetermined time has elapsed from when the electronic device was removed from a part of a human body.

2. The electronic device of claim 1, wherein the processor is configured to:
   control the communication interface to not transmit a message to the another device via the network in a case that it is determined that the electronic device is worn on a part of a human body before a predetermined time has elapsed from when the electronic device was removed from a part of a human body.

3. The electronic device of claim 1, further comprising: the sensor configured to detect whether the electronic device is worn on a part of a human body.

4. The electronic device of claim 1, wherein the another device is a server.

5. The electronic device of claim 1, wherein
   the processor is configured to control the communication interface to transmit, as the message, a request for information in the case that it is determined that the electronic device is worn on a part of a human body after predetermined time has elapsed from when the electronic device was removed from a part of a human body.

6. The electronic device of claim 1, wherein
   the another device is a mobile terminal.

7. The electronic device of claim 1, wherein the processor is configured to:
   determine a current time; and
   select the message to be transmitted to the another device based on the determine current time.

8. The electronic device of claim 1, wherein
   determine a current time; and
   select the message, from a plurality of different messages requesting different types of content, to be transmitted to the another device based on the determined current time.

9. The electronic device of claim 1, further comprising:
   a user interface, wherein
   the processor is configured to
      detect a plurality of operation modes of the user interface; and
      control the communication interface to transmit an operation signal according to the detected operation mode to the another device.

10. The electronic device of claim 1, wherein
    the processor is configured to control the communication interface to transmit, to the another device, an instruction that causes the another device to perform a process that varies based on whether the information processing device is worn on a part of a human body.

11. The electronic device of claim 1, wherein
    the electronic device is an earphone configured to be worn on a user's ear.

12. An electronic device comprising:
    a communication interface configured to communicate with another device via a network; and
    a processor configured to
       determine, based on an output of a sensor, whether the electronic device if worn on a part of a human body;
       calculate a time duration between a last time that the electronic device was removed from a part of a human body and a time that it is determined that the electronic device is worn on the part of the human body based on the output of the sensor;
       compare the time duration to a predetermined threshold value; and
       control the communication interface to transmit a message from the another device based on a result of the comparing.

13. The electronic device of claim 12, wherein
    the processor is configured to control the communication interface to transmit the message when the time duration is greater than the predetermined threshold value.

14. The electronic device of claim 12, wherein
    the processor is configured to control the communication interface to not transmit the message when the time duration is less than the predetermined threshold value.

15. The electronic device of claim 12, wherein
    the another device is a server, and
    the message is a request for information from the server.

16. The electronic device of claim 12, wherein
    the another device is a mobile terminal, and
    the message is a request for information stored at the mobile terminal.

17. The electronic device of claim 12, wherein the processor is configured to:
  determine a current time; and
  select the message, from a plurality of different messages requesting different types of content, to be transmitted to the another device based on the determined current time.

18. The electronic device of claim 12, further comprising:
  a user interface, wherein
  the processor is configured to
    detect a plurality of operation modes of the user interface; and
    control the communication interface to transmit an operation signal according to the detected operation mode to the another device.

19. An electronic device comprising:
  a sensor configured to detect that the information processing apparatus is worn on a part of a human body;
  a communication interface configured to communicate with another device via a network; and
  a processor configured to
    determine, based on an output of a sensor, whether the electronic device is worn on a part of a human body;
    determine a current time;
    select a request for information, from among a plurality of requests for information, for transmission to the another device based on the determined current time when it is determined that the electronic device is worn on a part of a human body; and
    control the communication interface to transmit the selected request for information to the another device via the network.

* * * * *

UNITED STATES PATENT AND TRADEMARK OFFICE
CERTIFICATE OF CORRECTION

PATENT NO. : 10,104,213 B2  
APPLICATION NO. : 15/830234  
DATED : October 16, 2018  
INVENTOR(S) : Akihiro Ishida et al.

Page 1 of 1

It is certified that error appears in the above-identified patent and that said Letters Patent is hereby corrected as shown below:

In the Claims

Column 16, Line 39, change "if" to --is--;
Column 17, Line 17, change "the" to --an--;
Column 17, Line 22, change "a" to --the--.

Signed and Sealed this
Fifth Day of February, 2019

Andrei Iancu
*Director of the United States Patent and Trademark Office*